United States Patent [19]

Casale

[11] 4,064,441
[45] Dec. 20, 1977

[54] SCANNING DEVICE FOR SCINTIGRAPHY OF THE HUMAN BODY

[75] Inventor: Renato Casale, Rome, Italy

[73] Assignee: Ital Elettronica S.p.A., Italy

[21] Appl. No.: 667,314

[22] Filed: Mar. 16, 1976

[30] Foreign Application Priority Data

Apr. 17, 1975 Italy .................................. 49160/75

[51] Int. Cl.$^2$ ............................................. G01T 1/20
[52] U.S. Cl. ............................................. 250/363 S
[58] Field of Search ...................... 250/363 S, 366, 369

[56] References Cited

U.S. PATENT DOCUMENTS

| | | | |
|---|---|---|---|
| 3,852,601 | 12/1974 | Casale | 250/363 S X |
| 3,870,886 | 3/1975 | Casale | 250/363 S X |
| 3,970,852 | 7/1976 | Richey et al. | 250/369 X |

Primary Examiner—Davis L. Willis

Attorney, Agent, or Firm—Beveridge, DeGrandi, Kline & Lunsford

[57] ABSTRACT

A scanner for scintigraphy of the entire body, comprising: a frame provided with horizontally and lengthwise located guides; a carriage, movable with respect to the frame, along said guides, and provided with transversely slidable supports for one or two rods supporting the detectors; one or two rods slidable transversely on said supports, on said rods being mounted the detectors; one or more recording devices for the scintigraphic image; comprising a stationary rail parallel to the bed for the patient, and rolling means suitable to cause the sliding movement guided by the rail, of the frame with the carriage, the rods with the detectors and the recording devices, the rail being so located that most of the scanner slides between the rail and the patient bed, this too stationary, during the longitudinal scanning movement on the entire body.

10 Claims, 2 Drawing Figures

SCANNING DEVICE FOR SCINTIGRAPHY OF THE HUMAN BODY

The present invention relates to a device for the scintigraphic scanning according to a horizontal plane, for detecting the distribution of radio-isotopes in the body of patients, said device consisting of a scanner of a known type for scanning an area limited to a portion of the human body (such as for instance that described in the U.S. Pat. No. 3,870,886 filed on July 5, 1972 and granted on Mar. 11, 1975) provided with accessories allowing the scanning area on the patient to be extended to the entire body.

In the known scanning devices of the known type for entire body, the scintigraphy recording device has normally a reduced scale and forms a unit separate from that for the movement of the detectors on the patient; in the scanning devices of the limited area type, on the contrary, the recording device has usually a full size scale and forms a single unit with the movement unit of the detectors; the parts forming the scanner are therefore substantially different in the two cases. Also scanners have been embodied for the entire body using the main component parts of scanners of the limited area type, by having recourse to devices moving the bed of the patient synchronically with the movement of the scanners.

The scanner as hereinafter described has the advantage with respect to the scanning devices of known types, of utilizing the same component main parts of a limited area scanner also for scanning the entire body, utilizing for this purpose simple accessories which do not require the bed of the patient to be moved in the checking room, and which accordingly require an area reduced like the one required by the entire-body scanning device, with separate recording unit.

In order to reach the above cited advantages, use has been made of a structure of a scanner for scintigraphy for a limited area, of a known type, comprising:

a. a frame provided with horizontally and lengthwise located guides with respect to the bed of the patient to be checked;

b. a carriage, movable with respect to the frame of said guides, provided with supports transversely slidable with respect to the bed of the patient, suitable to support one or two rods supporting the detectors;

c. one or two rods transversely slidable on said supports on which the detectors are mounted;

d. one or two paper and/or photographic recording devices for the scintigraphic image in full-size scale, wherein the paper and/or the photographic film are supported integrally with respect to the frame, while the recording heads move lengthwise, integrally with the carriage, and transversely with a movement equal to that of the rods with respect to the carriage.

Said structure has been further provided with accessory devices as follows:

e. stationary rail, parallel to the patient bed, this too stationary and located with respect to the frame on the opposite side with respect to the patient bed, which will be therefore accessible on both sides;

f. rolling means, part of which slidably connect the frame to the rail along the same, and part of which form a slidable rest for the frame on the floor, near the bed of the patient;

g. a system of chains and/or toothed belts and gears connecting longitudinal movement of the frame with respect to the rail, with the longitudinal movement of the carriage with respect to the frame; this system is provided with a release device allowing to stop at will the movement of the frame with respect to the rail in the presence of the movement of the carriage with respect to the frame, and moreover is connected by a releasable clutch device to the same motor which imparts to the rods supporting the detectors, the transverse movement with respect to the carriage. Said system allows to transmit, from the motor, only the longitudinal motion of the carriage with respect to the frame, while maintaining at rest the frame with respect to the rail, while being also capable of transmitting a simultaneous movement of the frame with respect to the rail. In the first case, when the frame is stationary with respect to the patient, the longitudinal movement of the recording heads with respect to the paper and/or to the photographic film, will correspond to the one of the detectors with respect to the patient, both movements being equal to the movement of the carriage with respect to the frame, and the recording of a limited area in full size scale will be obtained. In the second case, with the frame movable with respect to the patient, the longitudinal movement of the heads will be less than that of the detectors with respect to the patient, which is equal to the sum of the movement of the carriage with respect to the frame plus the movement of the frame with respect to the rail, and the recording will be obtained of an area extended to the entire body in a reduced scale, depending upon the drive ratios as selected for the two movements of the carriage and of the frame.

h. A system of chains and/or of toothed belts and gears connecting the transversal movement of the rods supporting the detectors with respect to the carriage, to the transversal movement of the recording heads with respect to the carriage; this system being provided with two different ratios which can be selected at will, one of said ratios determining for the recording heads a movement equal to that of the rods and the other ratio a reduced movement, with a reduction ratio equal to the reduction ratio selected for the longitudinal movement. The one-to-one ratio of movement is utilized for recording a limited area in full size scale, and the reduced-movement ratio is used for recording an area extended to the entire body in a reduced scale.

For a more complete disclosure of this invention, hereinafter reference will be made to the attached drawings wherein.

Figure 1:
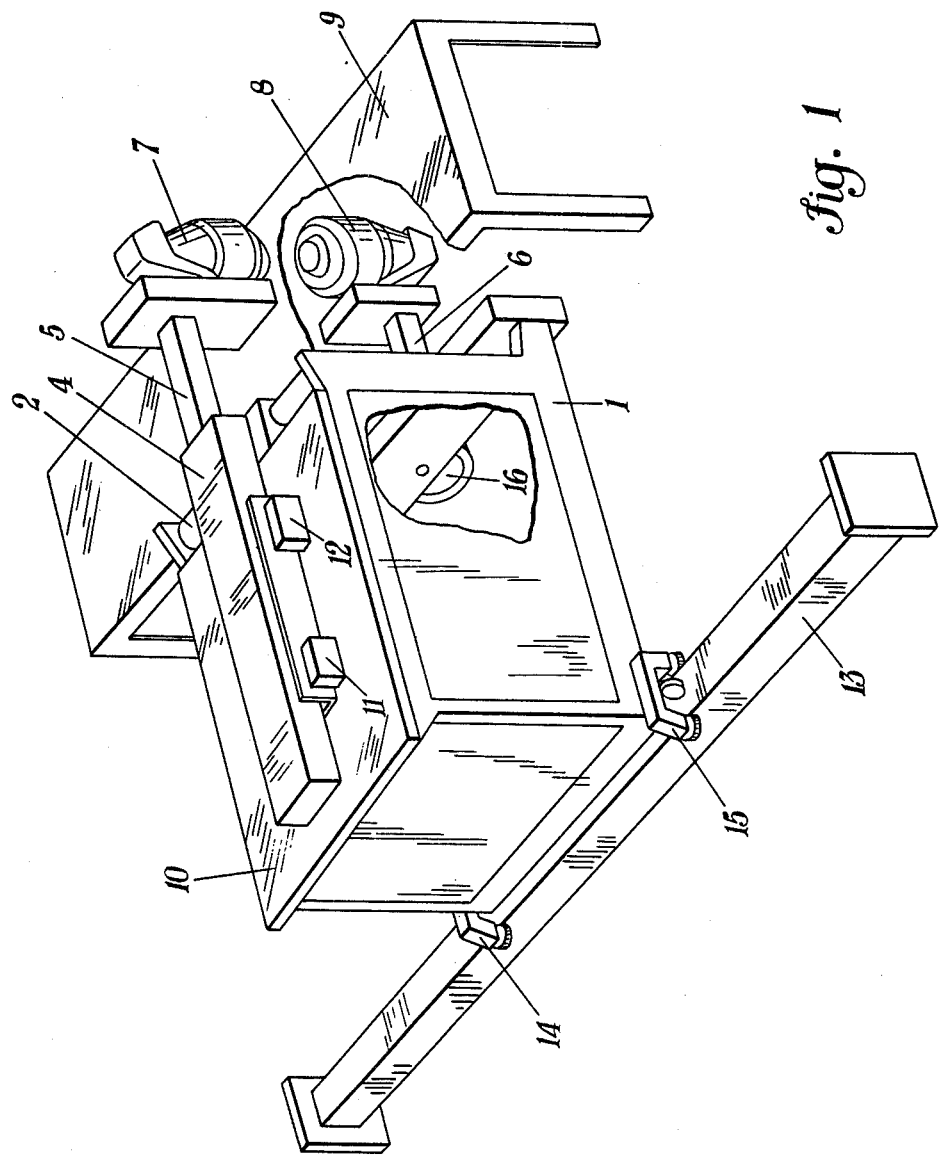
FIG. 1 shows a perspective view of a scanner with two detectors.
Figure 2:
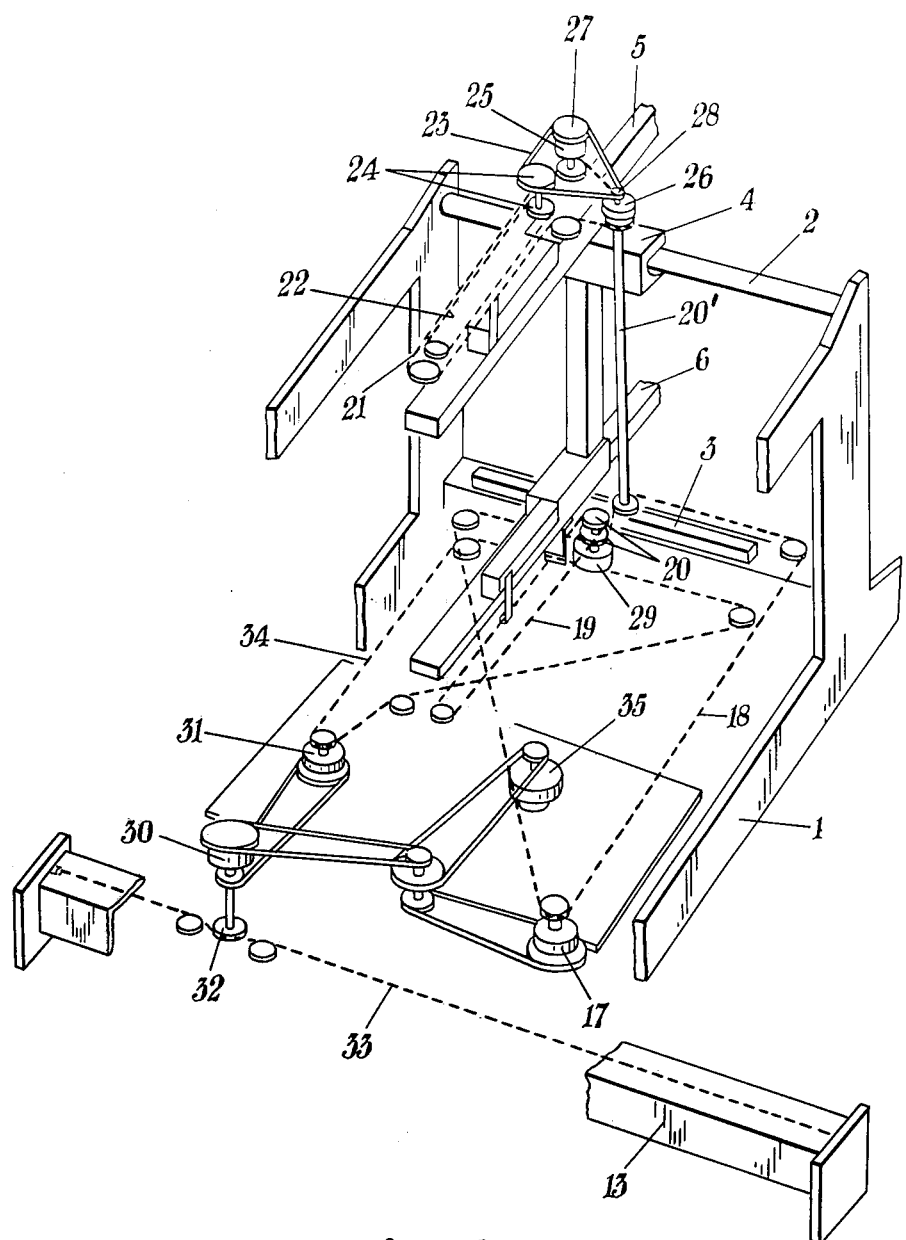
FIG. 2 shows the diagram of the system driving the movements of the various parts of the scanning device.

With reference to FIGS. 1 and 2, there has been shown the frame 1, provided with longitudinal horizontal guides 2 and 3 whereon the carriage 4 slides, said carriage containing transversely slidable supports within which the rods 5 and 6 slide to which are fastened the detectors 7 and 8 over and under the bed 9 for the patient. On the upper plane 10 of the frame the paper for recording the scintigraphy is fixed, which is printed by the writing heads 11 and 12. These heads move crosswise with respect to the carriage 4, and are supported slidably by transverse guides not shown in the figure, fixed to the carriage itself.

The frame 1 moves lengthwise guided by the rail 13 whereon it rests by the groups of bearings 14 and 15, and by means of the wheel 16 rolling on the floor.

In FIG. 2 there is shown the motor 35 driving all movements of the rods, of the carriage, of the frame and of the recording devices. The transverse movements of the rods 5 and 6, occur while the carriage 4 is braked with respect to the frame 1, for example, by an electromagnetic brake, not shown in the drawings, and are imparted by the motor to the electromagnetic clutch 17 by means of toothed belts and therefrom to the driving chain 18. This chain, driving the chain 19 by means of the pair of gears 20 rigid with one another, and the axis of which is rigid with the carriage, drives the rod 6. During this time, an electromagnetic brake 29, adapted to lock the chain 18 with respect to the carriage, remains free. The driving chain 18, furthermore, by means of the driving shaft 20', with supports rigid with the carriage, and of the gears mounted thereon, drives the chain 21 which operates the rod 5.

The chain 22 drives the writing heads 11 and 12, shown in FIG. 1, and is operated by the toothed belt 23 by means of the pair of co-axial gears 24. The toothed belt 23 can be operated at will by the electromagnetic clutches 25 or 26, which are operated by two identical gears, both engaged with the chain 21, and driving the gears 27 and 28, having different diameters, respectively. The gear 27 drives the belt 23 with such a movement that the movements of the chains 21 and 22 will be equal, while the gear 28 imparts a movement reduced according to the 1 to 5 ratio. During this transversal movement of the rods and of the recording devices, suitable electromagnetic brakes, not shown in the figures, will lock the movement of the frame with respect to the rail. Thus, also the electromagnetic clutch 30 will remain free, since the clutch 30 controls the movement of the frame on the rails.

The longitudinal movement of the carriage with respect to the frame with no movement of the frame with respect to the rail, is obtained by locking the electromagnetic brake 29 and de-energizing both the brake locking the carriage to the frame, not shown in the figure, and the electromagnetic clutches 30 and 31. Thus, the driving chain 18 will be locked to the carriage, as well as the rod operating chains 19 and 21, so that the driving chain will impart the longitudinal movement to the carriage.

Thus, as the frame is locked with respect to the rail, the longitudinal movement of the detectors with respect to the bed is equal to the longitudinal displacement of the carriage and of the writing heads 11, 12 with respect to the frame. By engaging the electromagnetic clutch 25 and disengaging the magnetic clutch 26, the transverse displacement of the writing heads 11 and 12 with respect to the frame is equal to the transverse displacement of the detectors with respect to the bed, thus obtaining scintigraphy in a 1:1 scale.

The longitudinal movement of the frame with respect to the rail, simultaneous with the movement of the carriage with respect to the frame, with no transverse movement of the rods with respect to the carriage will be obtained by locking the electromagnetic clutches 30 and 31 and the electromagnetic brake 29, and unlocking the electromagnetic clutch 17 and the two brakes, not shown in the figure, which locked the carriage to the frame, and the frame with respect to the rail. The gear 32 moves the frame with respect to the rail, by engaging on a rack-like chain 33 fastened to the rail, while the chain 34 stationary with the carriage moves the carriage itself with respect to the frame. The longitudinal movement of the frame with respect to the rail is four times greater than longitudinal movement of the carriage with respect to the frame; thus the displacement of the longitudinal detectors with respect to the patient bed, formed by the sum of the two longitudinal movements, will be five times greater than that of the carriage with respect to the frame; therefore, also five times greater than the longitudinal movement of the writing heads 11 and 12 with respect to the frame. By actuating the electromagnetic clutch 26 instead of the electromagnetic clutch 25, the transverse displacement of the writing heads 11 and 12 with respect to the frame will be thus 1/5 of the transverse displacement of the detectors with respect to the patient bed, obtaining thus a scintigraphy in 1/5 scale.

Having thus described the present invention, what is claimed is:

1. A scanner for scintigraphy of a body comprising:
  a. an elongated rail member adapted to be positioned at a bed to extend longitudinally of the bed parallel to a side thereof;
  b. a frame member movably supported on said rail member;
  c. first guide means connected to said frame member and extending parallel to said rail member;
  d. a carriage movably supported on said first guide means;
  e. support means connected to said carriage for movement therewith and extending transverse to said rail member;
  f. a rod member slidably mounted on said support means for movement transverse to said rail member;
  g. a scintigraphic detector mounted on said rod member for movement therewith, said detector adapted for positioning over the bed;
  h. a recording means coupled to said scintigraphic detector for recording scintigraphic images as detected by said detector; and
  i. drive means for moving said frame member along said rail, for moving said carriage member along said first guide means, and for moving said rod member along said support means to move said detector longitudinally and transversely with respect to the bed.

2. A scanner as claimed in claim 1 further comprising a second rod member slidably mounted on said support means for movement transverse to said rail member, a second detector mounted on said second rod member for movement therewith; and a second recording head coupled to said second scintigraphic detector for recording scintigraphic images as detected by said second scintigraphic detector.

3. A scanner as claimed in claim 1 further comprising second guide means connected to said carriage and extending transverse said first guide means; and in which said recording means is slidably mounted on said second guide means, and said drive means moves said recording means on said second guide means.

4. A scanner as claimed in claim 3 in which said drive means includes a system of chains and gears providing a predetermined reduction ratio between the longitudinal movement of said detector and the longitudinal movement of said recording means.

5. A scanner as claimed in claim 4 in which said drive means further includes a system of chains and gears providing said predetermined reduction ratio between the transverse movement of said detector and the transverse movement of said recording means, to record the scintigraphic images in a reduced scale.

6. A scanner as claimed in claim 5 in which said drive means includes means for preventing movement of said frame member along said rail while said carriage member moves along said first guide member.

7. A scanner as claimed in claim 6 in which said drive means further includes means controlling the ratio of the movement of said rod member relative to the movement of said recording means to permit the movement of said recording means to be reduced with respect to movement of said rod member, thereby allowing recording at the reduced scale, while also permitting the movement of said recording means to be equal to the movement of said rod member, thereby allowing recording at full scale of the scintigraphy of a reduced area.

8. A scanner as claimed in claim 1 in which said drive means includes a single motor and clutch means coupling said motor to said frame member, said carriage member, and said rod member.

9. A scanner as claimed in claim 1 in which said drive means includes means for preventing movement of said frame member along said rail while said carriage member moves along said first guide member.

10. A scanner as claimed in claim 1 in which said drive means includes means controlling the ratio of the movement of said rod member relative to the movement of said recording means to permit the movement of said recording means to be reduced with respect to movement of said rod member, thereby allowing recording of scintigraphic images at a reduced scale, while also permitting the movement of said recording means to be equal to the movement of said rod member, thereby allowing recording at full scale of the scintigraphy of a reduced area.

* * * * *